United States Patent [19]

Dewey et al.

[11] Patent Number: 5,368,264
[45] Date of Patent: Nov. 29, 1994

[54] WORKTABLE DEVICE WITH AUTOMATIC STABILIZING MECHANISM

[75] Inventors: William H. Dewey, Phoenix; Martin H. Hill, Syracuse, both of N.Y.

[73] Assignee: Built for Speed, Inc., Syracuse, N.Y.

[21] Appl. No.: 49,322

[22] Filed: Apr. 21, 1993

[51] Int. Cl.$^5$ ............................................. F16M 11/24
[52] U.S. Cl. ................................. 248/188.2; 248/649; 312/351.9
[58] Field of Search ...................... 248/649, 650, 188.2, 248/188.3, 188.4; 312/351.8, 351.4, 351.9; 108/153

[56] References Cited

U.S. PATENT DOCUMENTS

| | | | |
|---|---|---|---|
| 1,292,831 | 1/1919 | McCauley | 312/351.9 X |
| 1,652,774 | 12/1927 | Fraser | 312/351.8 X |
| 1,901,947 | 3/1933 | Bescherer | 248/188.3 |
| 2,979,857 | 4/1961 | Longbotham | 248/188.2 X |
| 3,222,021 | 12/1965 | Sisler | 248/188.3 |
| 4,262,870 | 4/1981 | Kretchman | 248/649 |
| 4,801,114 | 1/1989 | Price | 312/351.8 X |
| 5,261,334 | 11/1933 | Chevoor | 108/153 |

FOREIGN PATENT DOCUMENTS 28578 of 1907 United Kingdom ............ 248/188.2

Primary Examiner—J. Franklin Foss
Attorney, Agent, or Firm—Staas & Halsey

[57] ABSTRACT

A portable worktable includes a work platform and an automatic stabilizing mechanism for stably supporting the platform on an uneven floor. First and second horizontally spaced, generally parallel panels are arranged so as to extend downwardly from the work platform. The stabilizing mechanism includes a pair of support feet fixed to a lower portion of one of the panels. The stabilizing mechanism also includes a beam member which is swingably mounted at a lower portion of the other panel for swinging relative to the platform about a generally horizontal axis. Another pair of support feet are mounted on the beam member at respective opposite ends thereof so that the swinging axis of the beam is disposed centrally of the support feet on the beam. The device also includes a locking mechanism for releasably holding the beam member in a chosen fixed position relative to the platform.

4 Claims, 1 Drawing Sheet

WORKTABLE DEVICE WITH AUTOMATIC STABILIZING MECHANISM

BACKGROUND OF THE INVENTION

1. Field of the Invention

The present application relates to portable worktable devices and in particular to such a worktable device which includes an automatic stabilizing mechanism for supporting a work platform on an uneven floor.

2. The Prior Art Environment

Portable worktable devices by necessity are utilized in an environment in which the user has no control over the evenness of the floor surface where the worktable is used. Accordingly, it has been difficult to stabilize such devices to provide a secure and stable work platform. Three-legged devices are potentially useful; however, three-legs still present stability problems. On the other hand, while a device with four support points is inherently more stable than a three-legged device, the utilization of devices with four support feet in the past has required either a completely level floor surface or some sort of shimming arrangement provided at at least one of the support feet. The thickness of the necessary shim is never known in advance and the shimming operation itself inserts an impracticality into the stabilization operation.

SUMMARY OF THE INVENTION

The present invention provides a solution and remedy for the foregoing problems by providing a portable worktable device which is equipped with an automatic stabilizing mechanism. In accordance with the present invention, the portable worktable device comprises a work platform and an automatic stabilizing mechanism for supporting the platform. The stabilizing mechanism includes at least two spaced support feet. The stabilizing apparatus also includes a swingable elongated beam member carrying the support feet. The beam member is mounted for swinging relative to the platform about a generally horizontal axis disposed centrally of the support feet thereon.

In a preferred embodiment of the invention, the worktable device includes first and second horizontally spaced, generally parallel support panels which extend downwardly from the work platform. Two support feet are fixed to a lower portion of the first panel, and the beam member is swingably mounted at a lower portion of the second panel. The worktable device also preferably includes a locking mechanism for releasably holding the beam member in a fixed position relative to the platform.

In a particularly preferred form of the invention, the portable worktable device is provided with an arcuate slot in the second panel. In this form of the invention the locking mechanism may include a threaded shank which is attached to the beam member and extends through the arcuate slot. A nut may be threaded onto the threaded end of the shank on the opposite side of the second panel from the beam member so that by tightening the nut on the threaded shank the beam member may be releasably held in a fixed position relative to the second panel.

DETAILED DESCRIPTION OF A PREFERRED EMBODIMENT OF THE INVENTION

Figure 1:
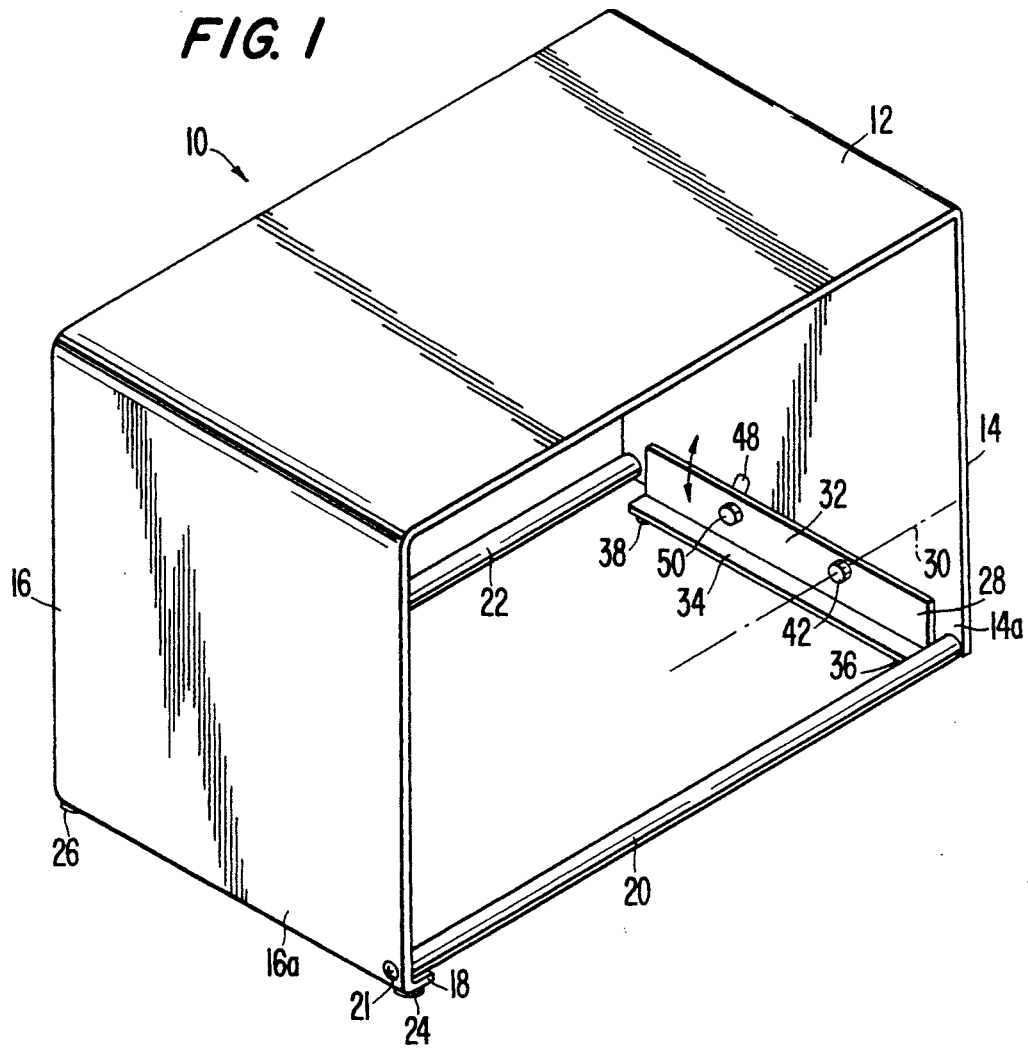
FIG. 1 is a perspective view of a portable worktable device which embodies the concepts and principles of the invention.
Figure 2:
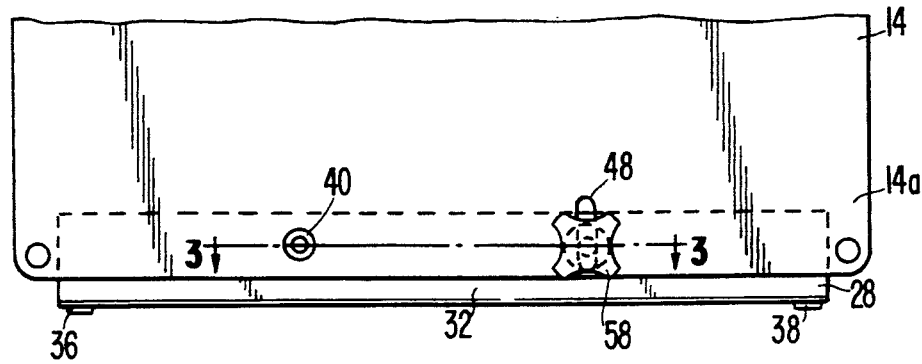
FIG. 2 is an enlarged elevational view illustrating the lower portion of the right hand end of the device of FIG. 1.

The present invention provides a portable worktable device 10 as is illustrated in FIG. 1. The device includes a work platform 12 serving a multiplicity of purposes. For example, the work platform may be utilized for mounting a clamping device or the like for holding a workpiece. In general, the work platform may serve any purpose which is facilitated by a stable worktable environment. In this regard, the work platform may be planar as illustrated or may take on any number of shapes to facilitate specific operations. It is simply noted in passing that the exact purpose of the work platform does not form a part of the present invention and for purposes of the invention the work platform may be take on any form for which a stabilized work environment is required.

In accordance with the illustrated preferred form of the invention, the platform 12 may be rectangular and elongated and may include end panels 14 and 16 at respective opposite ends of the platform 12. As can be seen in FIG. 1, the panels 14 and 16 are horizontally spaced, are generally parallel, and are disposed so as to extend downwardly from the platform 12. Additionally, as can be seen in FIG. 1, in the preferred form of the invention an inturned lip 18 is provided at the lower portion 16a of panel 16.

While panels 14 and 16 are generally parallel, it can be seen from FIG. 1 that these panels may actually flare outwardly slightly at the lower ends thereof for the purpose of providing a slightly wider base for the work platform 12.

Spacer rods 20 and 22 are provided at respective sides of the device for interconnecting the lower portion 16a of panel 16 with the lower portion 14a of panel 14. These rods 20 and 22 improve the overall rigidity of the portable worktable device 10. Screws 21 may be provided to secure the ends of the rods 20, 22 to each respective panel.

Support feet 24 and 26, which may be in the form of rubber pads, are affixed to respective sides of panel 16 at opposite ends of the lip 18.

A swingable elongated L-shaped beam member 28 is mounted on panel 14 for swinging relative to work platform 12 about a generally horizontal axis 30. Beam 28 includes a vertical segment 32 and a horizontal lip segment 34. Support feet 36, 38 are fixed at respective ends of the lip segment 34 as can be seen in FIG. 1. The support feet 36 and 38 may be of the same essential form as the feet 24 and 26 which are fixed to the lip 18 at the lower portion 16a of the panel 16.

As mentioned previously, the beam 28 is mounted for swinging in a generally vertical plane about a generally horizontal axis 30 which extends generally perpendicularly through the plane of panel 14. Also, as can be seen from FIG. 1, the axis 30 extends through the lower portion 14a of panel 14. Moreover, axis 30 is disposed centrally of feet 36 and 38 so that when beam 28 swings about axis 30 one of the feet 36, 38 swings relatively upwardly and the other of these feet swings relatively downwardly.

Figure 3:
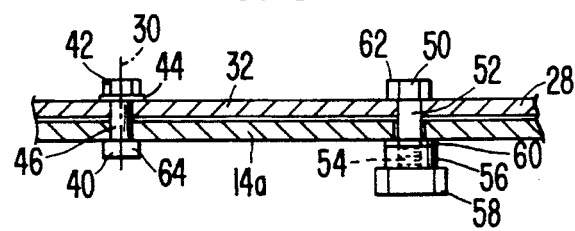
FIG. 3 is a cross-sectional view taken along the line 3—3 of FIG. 2.

The structure for swingably mounting beam 28 on panel 14 is illustrated in detail in FIG. 3. Thus, segment 32 of beam 28 is supported by a bolt and nut arrangement which includes a bolt 40, a nut 42 and a washer 44, which arrangement permits beam 28 to swing about the generally horizontal axis 30 which is defined by the longitudinal axis of the shank portion 46 of the bolt 40.

To facilitate swinging of the beam 28 about the axis 30 and to provide for locking of the beam in a particular position relative to panel 14 and therefore platform 12, an arcuate slot 48 is provided in panel 14. A bolt 50 carried by beam 28 has a shank 52 which extends through slot 48 as can be seen viewing FIG. 3. Shank 52 is provided with a threaded end 54, and a nut 56 is threaded onto the threaded end 54 as shown. Nut 56 may be provided with a conventional hand knob 58 to facilitate the tightening and loosening procedures. Also, a washer 60 may be provided for conventional purposes. The head 62 of bolt 50 may be fixed to beam 28 by glue or by solder or the like to facilitate the operation of the nut and bolt arrangement. Likewise, the head 64 of bolt 40 may be fixed to the panel 14 by glue or by solder, etc.

As can be seen, the knob 58 and the nut 56 are on an opposite side of panel 14 from the beam 28. And the nut 56, the bolt 50 and the groove 48 provide a locking mechanism for holding the beam 28 in a fixed position relative to panel 14 as well as to work platform 12.

The beam 28 and its support feet 36 and 38 provide a stabilizing mechanism for supporting the work platform 12. Nut 56 may be loosened to permit relative movement between beam 28 and panel 14 about the axis 30 of shank portion 46. During such movement the shank portion 52 of nut 50 remains within the confines of arcuate groove 48. On the other hand, when nut 56 is tightened relative movement is not permitted between beam 28 and panel 14.

In operation, no matter what the initial position of beam 28 relative to panel 14, and no matter how uneven is the surface on which the workbench is placed, three of the feet may generally be brought into contact with the surface. One of the feet, on the other hand, may be elevated. Upon loosening nut 56 to permit relative movement between beam 28 and panel 14, beam 28 will swing in a direction to bring either foot 36 or foot 38, as necessary, into rigid contact with the surface. The weight of the device, or the application of a slight downward pressure to the top of the work platform 12 will cause the beam 28 to swing about the axis 30 in a correct direction until all of the feet of the device, including the feet 36 and 38, are securely in contact with the floor surface. In this regard, depending upon the relative elevations of the various feet, the beam 28 will rotate in either a clockwise or a counterclockwise direction, as is necessary, to bring the feet 36 and 38 securely into contact with the surface.

We claim:

1. A portable worktable device comprising:
    a generally C-shaped table comprising an elongated, generally horizontal upper work platform having a pair of spaced ends and a pair of generally parallel, vertically extending, horizontally spaced end panels, said end panels each extending downwardly from a respective end of said platform;
    an elongated beam member having a respective support foot at each end thereof;
    a pivot structure mounting a first end of said beam member at a lower portion of one of said panels with said support feet facing downwardly, said pivot structure permitting swinging of the beam member about a generally horizontal axis relative to said one of said panels,
    said one of said end panels having an arcuate slot therein disposed adjacent a second end of said beam member; and
    a locking mechanism comprising (1) a threaded shank mounted on said beam member at said second end thereof and extending through said slot to present a free end disposed on the opposite side of said one of said panels from said beam member and (2) a nut threaded onto said free end of the shank to lock said beam member against said one of said panels when tightened.

2. A portable worktable device as set forth in claim 1, wherein said beam member is located between said end panels and said nut is located outside the device.

3. A portable worktable device as set forth in claim 1, wherein is included at least one horizontal rigidifying spacer extending between said end panels.

4. A portable worktable device as set forth in claim 1, wherein said platform and said end panels are integrally formed.

* * * * *